A. Davis.
Making Wooden Boxes.
No. 10,788.    Patented Apr. 18, 1854.
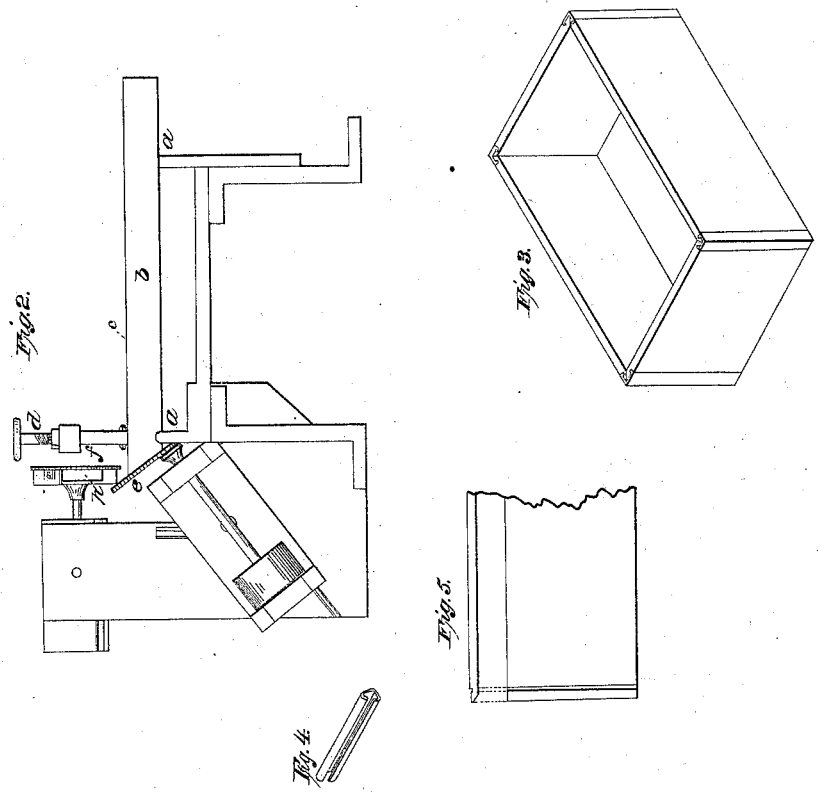
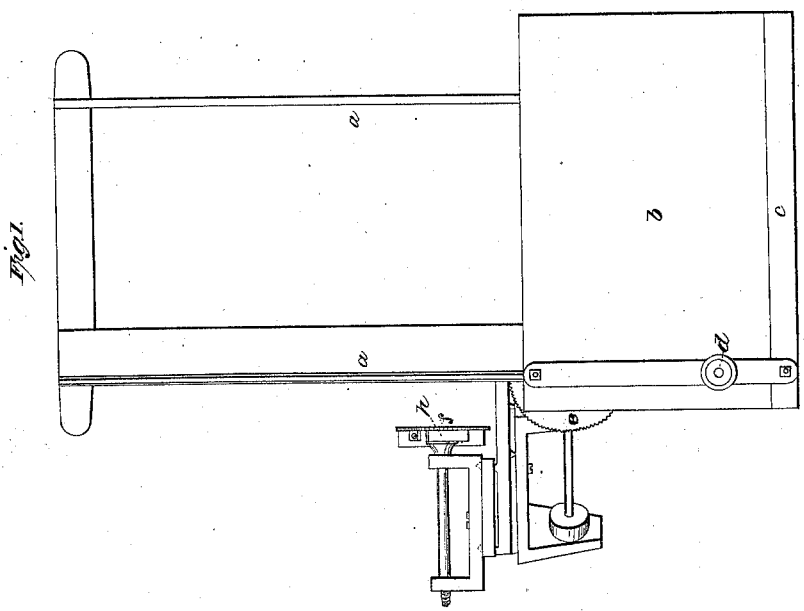

UNITED STATES PATENT OFFICE.

ARI DAVIS, OF WASHINGTON, DISTRICT OF COLUMBIA.

BOX-MACHINE.

Specification of Letters Patent No. 10,788, dated April 18, 1854.

*To all whom it may concern:*

Be it known that I, ARI DAVIS, of Washington, District of Columbia, have invented certain new and useful Improvements in Manufacturing Boxes and the Machinery Therefor, and that the following is a full, clear, and exact description of the principle or character which distinguishes them from all other things before known and of the usual manner of making, modifying, and using the same.

Figure 1 is a top view of the machine for preparing the boxes. Fig. 2 is a front elevation. Fig. 3 is a perspective of the finished box. Fig. 4 is the piece of angle metal. Fig. 5 shows the miter joint.

My improvements in the mode of putting together boxes consists in attaching the parts at the corners by angle irons of a peculiar construction by which I am enabled to securely fasten them without the use of nails or screws and with an expedition heretofore unknown making a box of unusual strength, cheapness, and beauty. To effect this I have a machine of the following construction: On a suitable frame there are two V or other shaped ways or rails ($a$) on which a carriage ($b$) slides in a right line. Upon this carriage there is a proper guide fence ($c$) and a holdfast ($d$) to place and hold the material in position to be worked. At the front side of the carriage outside the rails on one side a circular saw ($e$) is hung in proper bearings affixed to the frame. This saw stands with its plane at an angle of 45° to the plane of the carriage on which the board rests and as the carriage passes along in front of it chamfers the board to that angle, after which the board passes under a circular saw ($f$) perpendicular to its surface which cuts a score in the board at a sufficient distance from its edge and the space between the score and the edge may be reduced the thickness of the metal angle hereafter described by a cutter wheel ($h$) attached to and revolving with the saw ($f$) on the same shaft. A thin strip of metal is then bent into a right angle its whole length and its two edges are also turned inward at a right angle as clearly shown in Fig. 4, and the edges of two boards being mitered as above described and placed together so as to form a right angle the angle of metal is slipped on to the corner the edges entering the scores above named and the angle covering the corner the whole depth of the box; with glue or other aid this box is found to be stronger than when made in any other way.

It is obvious that other angles than a right angle can be equally well made on this plan by changing the angle of the inclined saw.

Having thus fully described my improved mode of fastening boxes at the corners and the machinery therefor what I claim therein as new and for which I desire to secure Letters Patent is—

The corner fastened in the manner described by forming a miter joint and scoring the outside of the box in the manner described and fastening the two parts at the corner by the angles of metal as herein specified without the use of nails or screws therefor. I also claim the combination of saws and cutters for forming the joint as above described.

ARI DAVIS.

Witnesses:
B. R. MERRELL,
E. L. HOUGHTON.